US007443399B2

(12) United States Patent
Hama

(10) Patent No.: US 7,443,399 B2
(45) Date of Patent: Oct. 28, 2008

(54) COMMUNICATION TERMINAL APPARATUS AND METHOD FOR DISPLAYING CHARACTERS ON COMMUNICATION TERMINAL APPARATUS

(75) Inventor: Mitsuji Hama, Higashiosaka (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 1037 days.

(21) Appl. No.: 10/483,032

(22) PCT Filed: Jul. 8, 2002

(86) PCT No.: PCT/JP02/06914

§ 371 (c)(1),
(2), (4) Date: Jul. 12, 2004

(87) PCT Pub. No.: WO03/007289

PCT Pub. Date: Jan. 23, 2003

(65) Prior Publication Data

US 2004/0242280 A1 Dec. 2, 2004

(30) Foreign Application Priority Data

Jul. 10, 2001 (JP) ............................ 2001-208683

(51) Int. Cl.
*G06T 11/00* (2006.01)

(52) U.S. Cl. ...................................... 345/467; 455/566

(58) Field of Classification Search ................. 345/467, 345/468, 469; 455/566, 158.4, 158.5
See application file for complete search history.

(56) References Cited

U.S. PATENT DOCUMENTS

| | | | | |
|---|---|---|---|---|
| 4,585,360 | A | 4/1986 | Ueda | |
| 4,703,322 | A * | 10/1987 | Goss et al. | 345/469 |
| 5,189,730 | A * | 2/1993 | Kajimoto | 345/442 |
| 5,818,432 | A * | 10/1998 | Tsutsumi | 345/467 |
| 5,991,515 | A * | 11/1999 | Fall et al. | 358/1.15 |
| 6,282,327 | B1 * | 8/2001 | Betrisey et al. | 382/299 |
| 6,952,236 | B2 * | 10/2005 | Orr | 348/465 |

FOREIGN PATENT DOCUMENTS

| | | |
|---|---|---|
| EP | 1 063 835 | 12/2000 |
| JP | 9-237074 | 9/1997 |
| JP | 2000-29811 | 1/2000 |
| JP | 2000-311041 | 11/2000 |
| JP | 2002-7278 | 1/2002 |

* cited by examiner

*Primary Examiner*—Kwang B. Yao
*Assistant Examiner*—Andrew Lai

(57) ABSTRACT

A communication terminal apparatus that displays, on a display unit, character data included in e-mail messages, wherein the controlling unit (20) detects, among pieces of character data, pieces of data for delimiters such as spaces. When the controlling unit (20) has detected that delimiters of a same kind are arranged in a sequence longer than a predetermined upper limit, the controlling unit (20) instructs the main display unit (2') that the excessive pieces of data for the delimiters beyond the upper limit should not be displayed. The main display unit (2') does not display such pieces of data that are specified in the instruction.

10 Claims, 4 Drawing Sheets

START
S301 CHARACTER MESSAGE DISPLAY INSTRUCTION IS RECEIVED
S302 DISPLAY INHIBITING MODE = ON? (YES / NO)
S304 ·POSITION COUNTER ← 0 ·SEQUENCE COUNTER ← 0
S305 ·DATA FOR ONE CHARACTER IS READ ·POSITION COUNTER IS INCREMENTED BY 1
S306 IS WHAT HAS BEEN READ SPACE CHARACTER? (YES / NO)
S307 SEQUENCE COUNTER IS INCREMENTED BY 1
S308 VALUE OF SEQUENCE COUNTER ≧ THRESHOLD VALUE? (YES / NO)
S309 VALUE OF POSITION COUNTER IS SAVED AS POSITIONAL INFORMATION OF DISPLAY INHIBITION TARGET
S310 SEQUENCE COUNTER ← 0
S311 HAS ALL CHARACTER DATA BEEN CHECKED? (YES / NO)
S303 ONLY CHARACTER MESSAGE DATA IS OUTPUTTED AND DISPLAY IS INSTRUCTED
S312 CHARACTER MESSAGE DATA AND DISPLAY INHIBITION INFORMATION ARE OUTPUTTED AND DISPLAY IS INSTRUCTED
END 1
2
3
4
5
6
7
8
9
10
11
12
13
14
15
16
17
18
19
30
31
32
OK

COMMUNICATION TERMINAL APPARATUS AND METHOD FOR DISPLAYING CHARACTERS ON COMMUNICATION TERMINAL APPARATUS

TECHNICAL FIELD

The present invention relates to communication terminal apparatuses and methods for displaying characters on communication terminal apparatuses, and in particular, communication terminal apparatuses that display character messages included in received e-mail messages and its methods for displaying characters on communication terminal apparatuses.

BACKGROUND ART

In recent years, mobile communication terminal apparatuses according to various systems including PHS (Personal Handyphone System), PDC (Personal Digital Cellular Telecommunication System), and CDMA (Code Division Multiple Access) have become widespread due to their compactness and lightness, improvement in communication quality, and reduction in their prices and in the call charges. Originally, these communication terminal apparatuses were generally for the purpose of voice communications, but recently they are often used for communications via e-mail. In addition, as a way of using communication terminal apparatuses, it is getting more popular to download and display data offered as services from various sites. When a communication terminal apparatus receives a character message such as one included in a received e-mail message, in order to present the character message to the user, the communication terminal apparatus converts character codes to character images that can be visually recognized on the display screen, and displays them on the display screen by aligning them according to the control codes (e.g. line feed codes, tabs, etc.).

This conventional display method, however, has a problem in treating delimiters such as spaces. For example, when an e-mail message is created in a provided format using a personal computer (hereafter, referred to as a "PC") by which the total number of characters to be displayed on the screen is large, sometimes space characters are shown in sequence, for example, "□□□N□□E□□W□□S" ("□" denoting a space) as in a heading. When this kind of heading is displayed on a display of a communication terminal apparatus in which the total number of characters to be displayed on the screen is only eight per line, the first line reads "□□□N□□E□", the second line, □W□□S. There is a meaningless line feed in the middle of the heading, and it is difficult to read. Further, in a case of a communication terminal apparatus that has only a limited number of lines on a display, when a lot of line feeds occur like this, the user experiences inconvenience, during operations of the apparatus, that he/she has to scroll the screen frequently. This inconvenient situation is more likely to occur when a message is created with an apparatus such as a PC, by which the total number of characters to be displayed on the screen is large, and is displayed on a mobile communication terminal apparatus in which the total number of characters to be displayed on the screen is small.

It should be noted here that a delimiter character is (i) any one of special characters other than alphanumeric characters, "Kana" (Japanese alphabets), and "Kanji" (Chinese characters in the Japanese language), and (ii) is a generic term for symbolic characters that have functions to delimit (or separate) characters or words. A typical example is a space character. Other examples include special characters shown in the signature portion of an e-mail message (e. g. "–", "~", "*") and pictorial characters which the user has optionally created or registered.

In view of the aforementioned problem, an object of the present invention is to provide a communication terminal apparatus and a method for displaying characters that make it possible to display on the screen a character message that includes delimiter characters in a sequence, in such a way that the receiver of the message is able to easily read the message without experiencing inconvenience such as having to frequently scroll the display.

DISCLOSURE OF THE INVENTION

In order to achieve the object, the present invention provides a communication terminal apparatus that receives and displays, on a display unit, pieces of character data, comprising: a detecting unit operable to detect, among the received pieces of character data, an overlong delimiter string which is made up of pieces of data that are for delimiters of a predetermined kind and are arranged in a sequence longer than a predetermined upper limit; an inhibition target specifying unit operable to specify one or more of the pieces of data in the overlong delimiter string as an inhibition target, which is to be inhibited from being displayed; and a display controlling unit operable to control the display unit so that the received pieces of character data except for the inhibition target are displayed.

With this arrangement, when a character message is to be displayed, in a case where delimiter characters are arranged in a sequence longer than a predetermined upper limit, by inhibiting part of the sequence of delimiter characters from being displayed, it is possible to display the character message including delimiter characters in such a way that the user is able to read the message easily without experiencing inconvenience of, for example, having to scroll the display frequently.

The same advantageous effects can be achieved through the program of the present invention that causes a computer to execute the processing of the aforementioned communication terminal apparatus, or the method of the present invention for displaying characters by sequentially executing the processing performed by the components of the apparatus.

Further, it is also acceptable that the communication terminal apparatus further comprises a designation receiving unit operable to receive a designation of whether it is necessary to perform the display inhibition on delimiters, and when the designation receiving unit receives a designation that it is necessary, the detecting unit performs the detection of the overlong delimiter string.

With this arrangement, the user is able to choose freely whether display inhibition is to be performed or not.

It is also acceptable that the communication terminal apparatus further comprises an upper limit receiving unit operable to receive in advance a value specified as the predetermined upper limit, or a specified-kind receiving unit operable to receive what kind of delimiter is specified as the predetermined kind.

With these arrangements, the user is able to specify (i) the kind of delimiter characters to be the display inhibition target or (ii) the value of the upper limit for delimiter characters in a sequence.

In addition, it is also acceptable to have an arrangement wherein the delimiter characters are actually space characters.

The same advantageous effects can be achieved through the method of the present invention for displaying characters.

BEST MODE FOR CARRYING OUT THE INVENTION

The following describes the communication terminal apparatus in an embodiment of the present invention, with reference to the drawings.

The communication terminal apparatus of the present embodiment is characterized in that, when displaying a character message, it does not display an excessive part of a sequence of delimiter characters longer than a predetermined length (a threshold value). The user is able to choose whether such display inhibition is to be performed or not by setting the "display inhibition mode" ON or OFF. In addition, the user is also able to specify the threshold value and which kind of delimiter characters is to be the display inhibition target. The following explains an example where the user has specified so that (i) "space characters" among delimiter characters are the inhibition targets, and (ii) space characters positioned second and later in the sequence are inhibited from being displayed. It should be noted that, on the screen, spaces are merely recognized as blanks between other characters; however, in the following explanation, to provide a blank on the screen according to a piece of space character data will be expressed as "display a space character".

The following explains the structure and operations of the communication terminal apparatus of the embodiment.

External Structure

Firstly, the structure of the communication terminal apparatus of the embodiment will be described with reference to the drawings of the external views.

Figures 1A, 1B, 1C:
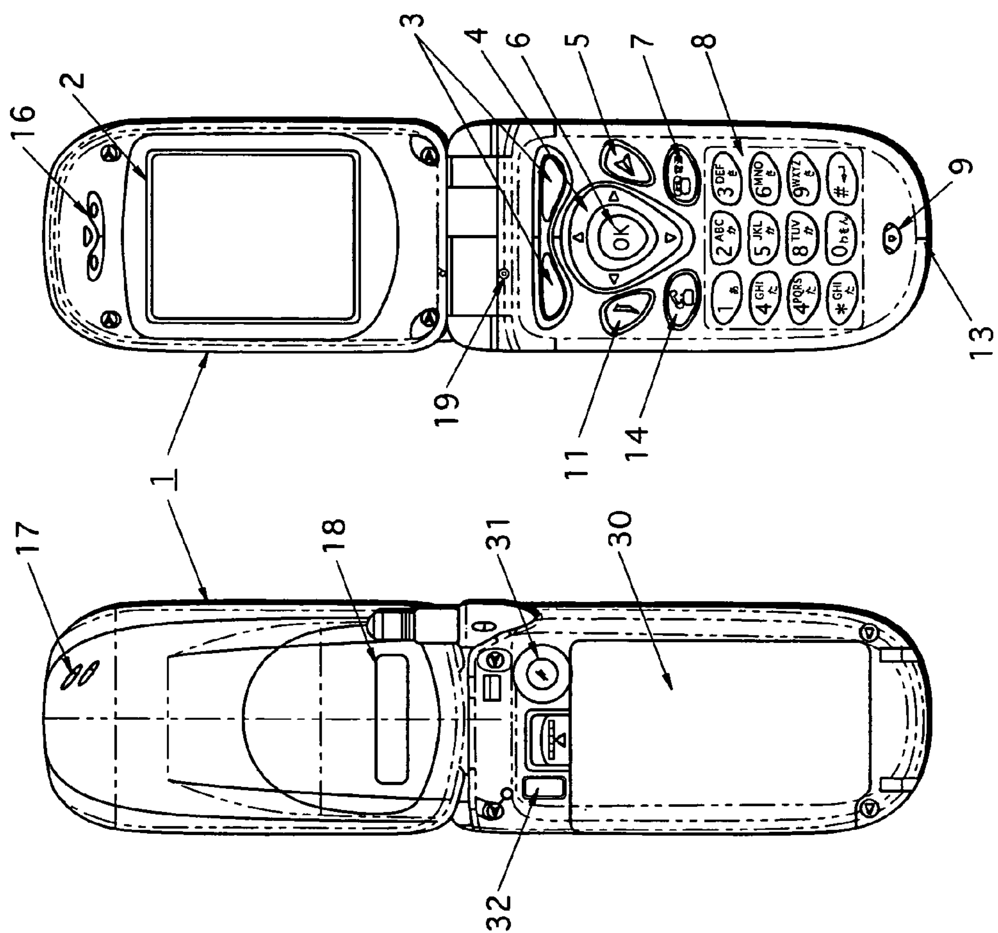
FIGS. 1A, 1B, and 1C are exterior views of the communication terminal apparatus that is according to the embodiment of the present invention and is opened.

FIGS. 1A, 1B, and 1C are exterior views of the communication terminal apparatus in the embodiment, shown as being opened. FIG. 1A is a rear view, FIG. 1B is a front view, and FIG. 1C is a right side view.

Normally, the communication terminal apparatus 1 is open when the user performs operations related to calls or e-mail transmission and reception, and is closed when it is on standby.

The main display unit 2 is, for example, a color liquid crystal display (e. g. a 256-color reflective STN color liquid crystal display), an organic electroluminescence (EL) display, a plasma display panel (PDP), a digital mirror device (DMD), or the like, and displays information to be provided to the user, text information, current time information, image information, and the like. The main display unit 2 also displays a character message included in an e-mail message. When a character message is displayed, the main display unit 2 is able to display five lines, with eight characters per line.

When the communication terminal apparatus 1 is closed, either the lights or the power of the main display unit 2 get turned off. This way, it is possible to save electricity.

The flexible keys 3 are used for various purposes in combination with other keys and buttons. For example, the flexible keys 3 are used for selecting an item from among item buttons displayed at the bottom section of the main display unit 2. Also, when the communication terminal apparatus 1 is on standby, one of the flexible keys 3 on the left works as a function key, and the other of the flexible keys 3 on the right works as a character key. The four-point button 4 is used for moving the cursor on the screen, scrolling what is displayed, setting the volume, invoking the memory dial function, redialing, and so on. The e-mail key 5 is used for making use of each of various e-mail functions (e. g. "Sky Mail", "Long Mail", etc.). The e-mail key 5 is also used for deleting characters displayed on the main display unit 2 and changing the display screens. The OK key 6 is used for confirming what the user has selected or the settings the user has made. The end/power key 7 is used for switching the power of the apparatus on and off, ending a call, and putting a call on hold. The ten keys 8 are used for inputting telephone numbers and characters.

The microphone 9 takes in the voice of the user during calls. The earphone terminal 10 is a terminal to which an earphone/microphone is to be connected.

The web key 11 is used for switching what is displayed on the main display unit 2 to a screen for the Internet connection or a screen for e-mail function. The web key 11 is also used for making use of the web and the stations. In addition, the web key 11 is used for having menus displayed in each of which a selection can be made from various items, selecting an item, and receiving settings.

As for an example of the menus to be displayed with use of the web key 11, there is a screen for making settings for the displaying inhibition mode. On this screen, the user is able to (i) switch the display inhibition mode on/off, (ii) set a threshold value for the length of a delimiter character sequence on which the display inhibition is to be performed, and (iii) select which kind of delimiter characters is to be the inhibition targets.

The side key 12 is used for taking photos with the camera (In other words, the side key 12 works as a shutter button). The side key 12 is also used for setting/canceling the simple answering machine mode, recording the voice of the caller, and playing what has been recorded. (In other words, the side key 12 also works as a MEMO button.) The external connection terminal 13 is a terminal to which an external device can be connected, such as a quick charger, a cigarette lighter charger, a mobile tool, and the like. The start key 14 is used for commencing a call or transmission and reception of e-mail messages.

The antenna 15 transmits and receives communication radio waves. The receiver 16 provides sounds by playing the audio data received from the caller and other various message sound data. The speaker 17 provides ring tones.

The sub display unit 18 is a color liquid crystal display, a digital mirror device (DMD), an organic electroluminescence (EL) display, or the like, and displays simple information that needs to be presented to the user during a standby period or when the apparatus receives a call, while the apparatus is closed and the main display unit 2 cannot be viewed from outside. In addition, the sub display unit 18 also works as an incoming call indicator lamp and a photo shooting lamp, which are usually provided separately. When the apparatus has received a call, the sub display unit 18 blinks in a color corresponding to each caller to notify the user of the incoming call. When a photo is to be taken, the sub display unit 18 emits light concurrently with the movement of releasing the shutter. When the communication terminal apparatus 1 is open, since detailed information is displayed on the main display unit 2, the built-in back light of the sub display unit 18 gets turned off to save electricity.

The open/close detecting switch 19 is a microswitch that mechanically detects that the communication terminal apparatus 1 is closed, completely open, or partway open.

The battery pack 30 supplies electricity needed by various circuits in the communication terminal apparatus 1.

The built-in camera 31 receives light that comes in through the lens and takes a photo of an object with use of a CCD or a C-MOS artificial retina IC (for example, M64270AG by Mitsubishi Electric: Artificial Retina LSI comprising a lens) The mirror 32 is for reflecting the user's image so that the user is able to see himself/herself when taking a photo of himself/herself with the camera 31.

Functional Structure

The following explains the structure of the communication terminal apparatus 1 in the present embodiment from a functional aspect.

Figure 2:
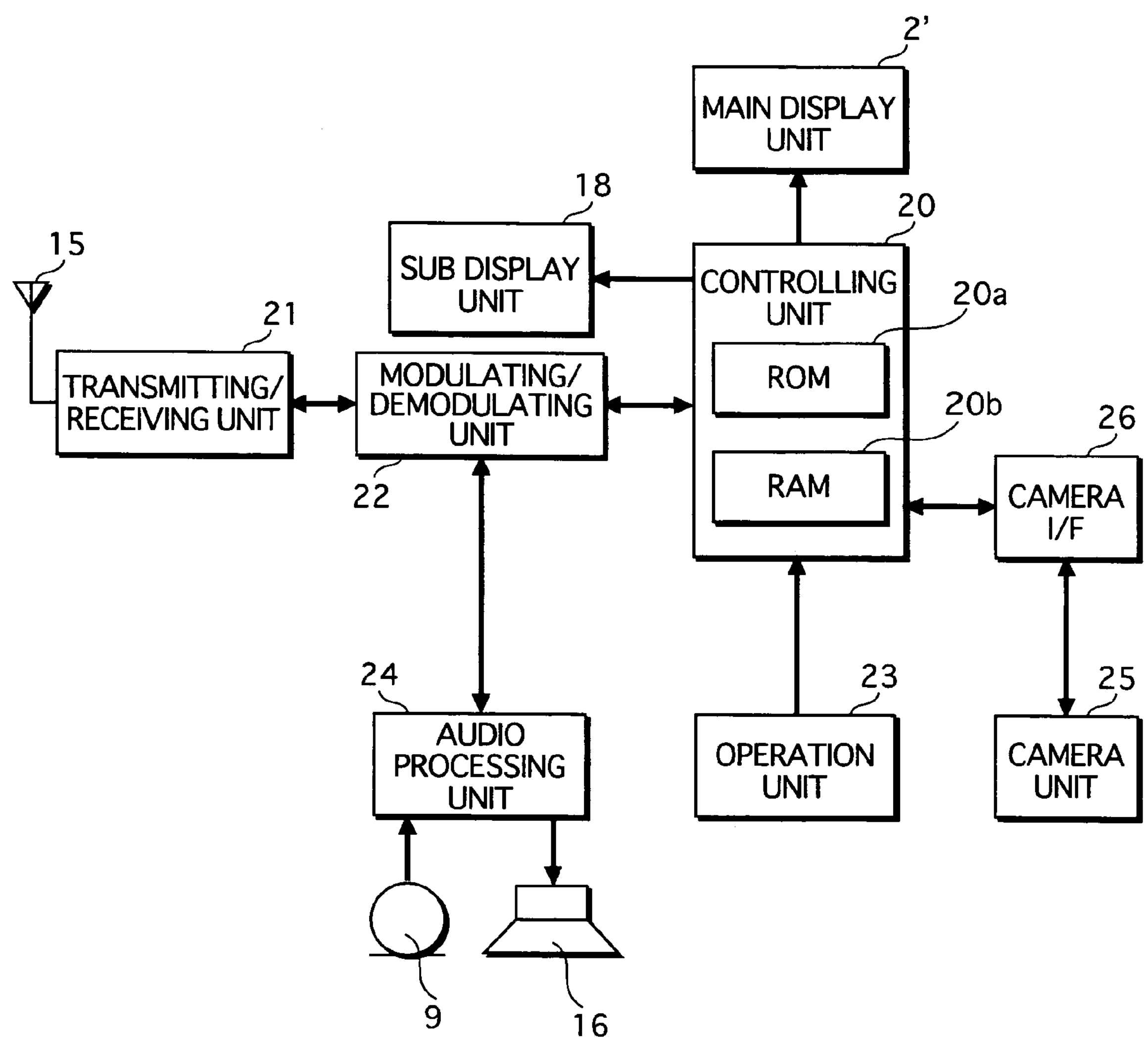
FIG. 2 is a block diagram that shows the structure of the communication terminal apparatus in the embodiment of the present invention.

FIG. 2 is a functional block diagram that shows the structure of the communication terminal apparatus 1 of the present embodiment. The drawing shows the structure of the communication terminal apparatus 1 in a case where it is a mobile terminal apparatus being a mobile phone according to the CDMA (Code Division Multiple Access) method based on the IS-95 (Interim Standard 95); however, the method of communication is not limited to the CDMA method, and it is also acceptable to use other methods such as PDC (Personal Digital Cellular) or PHS (Personal Handyphone System).

Among the components shown in FIG. 2, as for the components that are also shown in FIGS. 1A, 1B, and 1C, explanation will be omitted and they will have the same reference numbers. It should be noted that FIG. 2 shows, in addition to some of the components that are visible from outside (the components shown in FIGS. 1A, 1B, and 1C), the components that perform processing inside the apparatus in cooperation with such components. For example, the main display unit 2' shown in FIG. 2 is a combination of the main display unit 2 in FIG. 1B and the internal mechanism for having characters and images displayed thereon. The operation unit 23 comprises the flexible keys 3, the four-point button 4, the e-mail key 5, the OK key 6, the end/power key 7, the ten keys 8, the web key 11, the side key 12, the start key 14, the open/close detecting switch 19, and the internal mechanism that internally processes information obtained from these components. The camera I/F 26 performs processing related to the built-in camera 30. Receiving an instruction for taking a photo from the user, the camera I/F 26 instructs the built-in camera 30 to execute the photo taking process, and then stores the photo data obtained from the built-in camera 30 into the RAM (Random Access Memory) 20*b*.

Among the components shown in FIG. 2, the transmitting/receiving unit 21, the modulating/demodulating unit 22 (more specifically, a base band processing unit), the audio processing unit 24, and the controlling unit 20 are not shown in FIGS. 1A, 1B, and 1C. Among these, the controlling unit 20 functions as a primary component during the display inhibition process, which is a technical feature of the communication terminal apparatus 1. The following explains these components one by one.

The transmitting/receiving unit 21 transmits and receives radio waves via the antenna 15. The transmitting/receiving unit 21 provides signals obtained in the received radio waves for the modulating/demodulating unit 22 so that it demodulates those signals. The transmitting/receiving unit 21 also transmits the signals modulated by the modulating/demodulating unit 22 as radio waves.

The modulating/demodulating unit 22 (i) modulates signals of various kinds of data and provides them for the transmitting/receiving unit 21 and (ii) demodulates the signals acquired from the transmitting/receiving unit 21. Various kinds of data are audio data during the calls and non-audio data including character message data included in outgoing and incoming e-mail messages. The character message data is once stored into the RAM 20*b* and then will be displayed on the screen by the main display unit 2' in the form of character images.

Having demodulated signals included in the received audio data, the modulating/demodulating unit 22 provides the demodulated audio data signals for the audio processing unit 24. Having demodulated signals included in non-audio data such as character messages, the modulating/demodulating unit 22 provides the demodulated signals for the controlling unit 20.

The audio processing unit 24 processes, in a predetermined manner, the audio data signals acquired from the modulating/demodulating unit 22, and then provides them for the speaker 16. The audio data signals go through an electro-acoustic conversion process performed at the speaker 16 and get outputted as sound. In addition, the audio processing unit 24 processes, in a predetermined manner, the audio data that has gone through an acoustic-electric conversion process performed by the microphone 9, and provides the processed audio data signals for the modulating/demodulating unit 22.

Controlling Unit 20

The controlling unit 20 not only controls the exchange of data and instructions between other components and the user, but also controls the display of delimiter characters such as spaces when a character message is to be displayed on the display. The controlling unit 20 comprises a microprocessor (not shown in the drawing), a ROM (Read Only Memory) 20*a*, and the RAM 20*b*. The microprocessor executes the control program stored in the ROM 20*a*.

The controlling unit 20 stores, into the RAM 20*b*, information provided by the operation unit 23 and other components, as necessary. More specifically, such information includes: audio data to be transmitted or received, character message data, image data, telephone numbers registered by the user, settings for various operational modes (e. g. the display inhibition mode). Such information is stored temporarily or until the user performs an operation to delete or change it. The controlling unit 20 outputs the once stored information and data to other components according to an instruction from the user, and has each of those components perform processing including having a character message displayed on the screen. When a character message is to be displayed, the controlling unit 20 temporarily stores the message data received from the modulating/demodulating unit 24 into the RAM 20*b*, and checks the message data to see if space characters are arranged in a sequence. The controlling unit 20 then provides the character message data for the main display unit 2' along with an instruction to inhibit the excessive part of the sequence of space characters when it is longer than a predetermined length from being displayed, so that the character message will be displayed on the screen.

The following explains the processing performed by the controlling unit 20 when a character message is to be displayed.

At first, the controlling unit 20 receives, via the operation unit 23, an instruction from the user to have the message displayed. Having received the instruction, the controlling unit 20 reads the message data stored in the RAM 20*b* and provides it for the main display unit 2. At this time, the controlling unit 20 checks for space characters included in the message, and when it has been detected that two or more space characters are arranged in a sequence, the controlling unit 20 instructs the main display unit 2' to display, on the screen, only one space character in place of the sequence of space characters. More specifically, the controlling unit 20 provides the main display unit 2' with display inhibition information which indicates that the space characters positioned second and later should not be displayed, by attaching the information to the message data.

The controlling unit 20 also performs processing related to the on/off setting of the display inhibition mode. The user selects the item for "display inhibition mode setting" from the mode setting window displayed on the main display unit 2' and specifies either "turn the mode on" or "turn the mode off". The operation unit 23 informs the controlling unit 20 that this is a choice about "the display inhibition mode setting" and which one is selected either ON or OFF. The controlling unit 20 stores, in an area for "display inhibition information" in the RAM 20*b*, the choice of either ON or OFF, which has been notified by the operation unit 23.

Further, it is also acceptable to receive, from the user, a setting for a value of the upper limit for the length of a space character sequence in the mode setting window. In such a case, after the user turns the display inhibition mode on, the controlling unit 20 has a window displayed in which the number of characters can be specified so that the user inputs the number of characters desired in the window. The controlling unit 20 stores the value indicating the number of characters into the built-in RAM 20*b*. The value will be referred to during the process of displaying a character message. Likewise, it is also acceptable to allow the user to specify other delimiter characters to be the display inhibition targets besides space characters. Also, in such a case, after the user turns the display inhibition mode on, the controlling unit 20 has a window displayed in which a kind of delimiter characters can be specified so as to receive a choice of the kind. The controlling unit 20 stores what has been specified into the built-in RAM 20*b*. This information will be referred to during the process of displaying a character message.

Operation

The following explains the operations for having a character message displayed, which is performed by the communication terminal apparatus of the present invention structured as above, with reference to the drawings.

Figure 3:
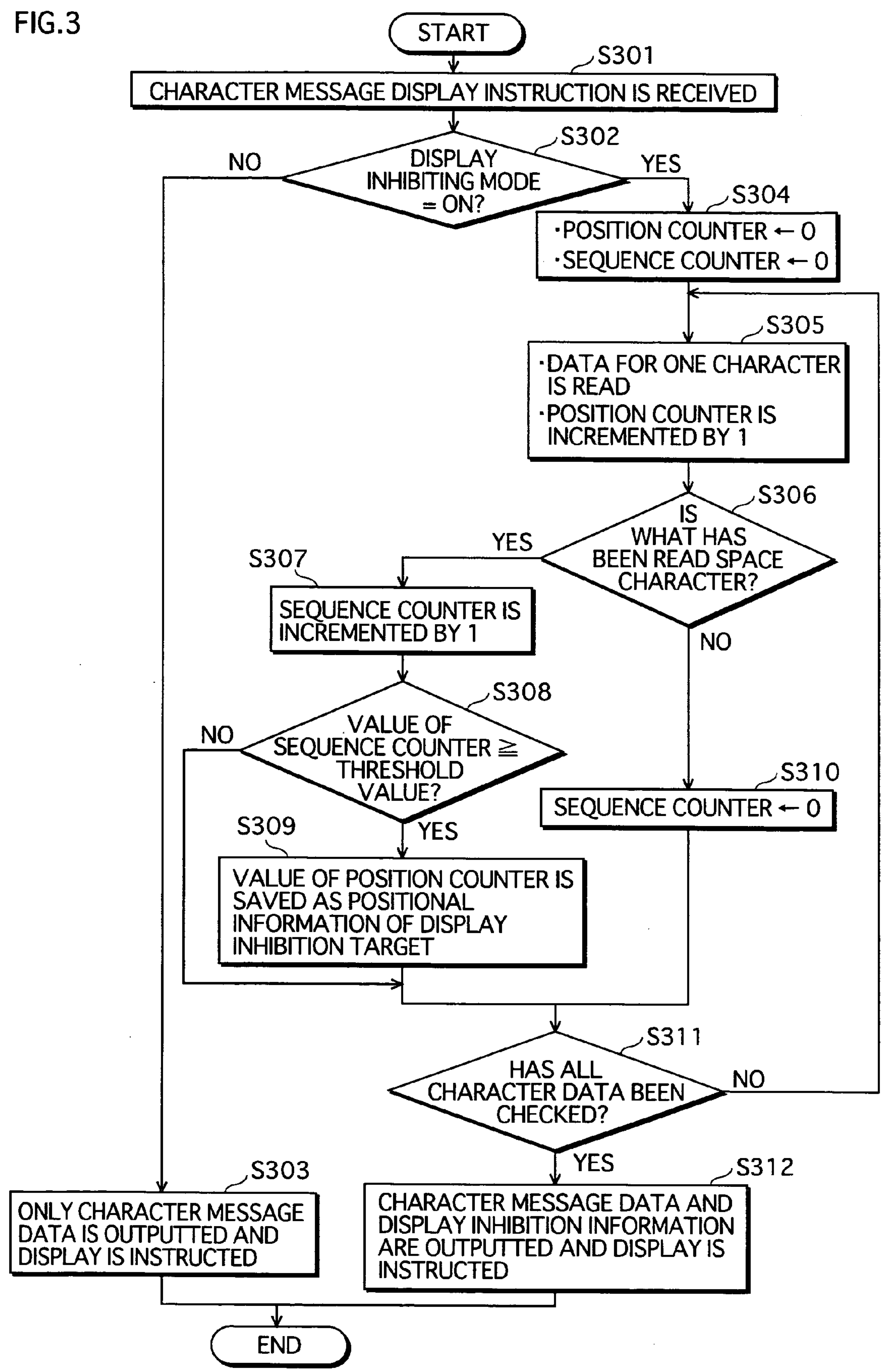
FIG. 3 is a flow chart that shows the flow of the message display process of the communication terminal apparatus in the embodiment of the present invention.

FIG. 3 is a flow chart that shows the character message display process performed by the communication terminal apparatus 1.

Firstly, the user instructs, with use of the operation unit 23, that a message included in a piece of received e-mail should be displayed. This instruction is sent to the controlling unit 20, and the message display process starts (S301). The controlling unit 20 refers to the display inhibition mode information stored in the RAM 20*b* and checks the mode, ON or OFF.

When the display inhibition mode is OFF, in other words, under the setting where space characters in a sequence will be displayed as they are (S302: No), after reading the character message data from the RAM 20*b*, the controlling unit 20 outputs the character message data to the main display unit 2' without attaching display inhibition information thereto and instructs that the character message should be displayed on the screen (S303). In such a case, since there is no display inhibition information, all of the space characters in the sequence will be displayed. The heading will be displayed in two lines.

Figure 4A:
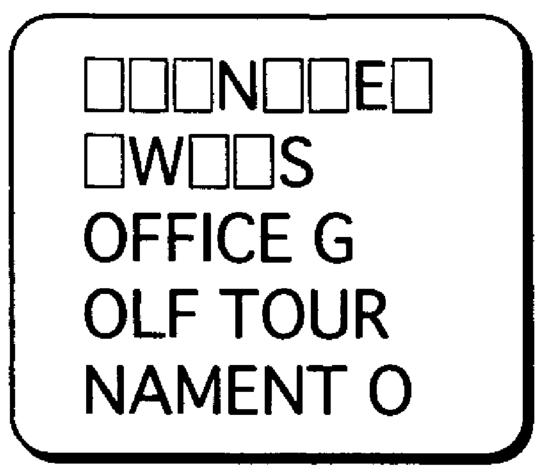
FIGS. 4A and 4B show examples of displays on the displaying unit of the communication terminal apparatus in the embodiment of the present invention.

FIG. 4A shows how a character message is displayed in a case where the display inhibition mode is OFF. In the drawing, "□" denotes one space character.

On the other hand, when the display inhibition mode is ON, in other words, under the setting where the space characters positioned second and later in a sequence will be inhibited from being displayed (S302: Yes), the controlling unit 20 provides the main display unit 2' with display inhibition information indicating the space characters to be the display inhibition target along with the character data of the message, so that the message will be displayed in such a manner that part of the space characters are inhibited from being displayed. The display inhibition information indicates the position (i. e. the m'th position to the n'th position from the beginning of the message) of the character data being the display inhibition target. The following specifically explains about the display inhibition process.

At first, the controlling unit 20 initializes the sequence counter and the position counter (sets each of them at zero) (S304). The sequence counter is for counting the number of space characters arranged in a sequence. The position counter indicates the position of each space character (x'th piece of character data from the beginning of the message data).

The controlling unit 20 reads character data for one character after another from the message data stored in the RAM 20*b*. Every time the controlling unit 20 reads character data for one character, the controlling unit 20 increments the position counter by one (S305). The controlling unit 20 then checks if the read character is a space character or not. When the read character is a space character (S306: Yes), the controlling unit 20 increments the sequence counter by 1 (S307).

Subsequently, the controlling unit 20 compares the value on the sequence counter after the increment with the threshold value ("2") (S308). When the value on the sequence counter is the same as or larger than the threshold value, it is necessary to perform the display inhibition of space characters, the controlling unit 20 registers those space characters as a target of display inhibition. More specifically, the controlling unit 20 reserves an area in the RAM 20*b* and stores therein the value on the position counter at this point (S309). The procedure then returns to S305.

When the value on the sequence counter is smaller than the threshold value (S308: No), display inhibition information will not be generated, and the procedure returns to S305.

As a result of the checking in Step S306 as to whether the read character is a space character or not, when it turns out that "it is not a space character" (S306: No), the controlling unit 20 sets the value on the sequence counter back at zero (S312), and the procedure returns to Step S305 where the controlling unit 20 reads the next piece of character data.

The procedure above (Steps S305 to S310) will be repeated until there is no more character data to be read and checked (S311: Yes). When all of the character data finishes to be processed, the controlling unit 20 puts together the stored positional information of the character data being the display inhibition target so as to generate display inhibition information. The controlling unit 20 then provides the main display unit 2' with this display inhibition information along with the character message data and instructs that the character message should be displayed on the screen (S312). When the procedure above is carried out on the character message shown in FIG. 4A, the display inhibition information reads "characters positioned second, third, sixth, ninth, twelfth, fifteenth, and eighteenth are inhibited from being displayed".

Figure 4B:
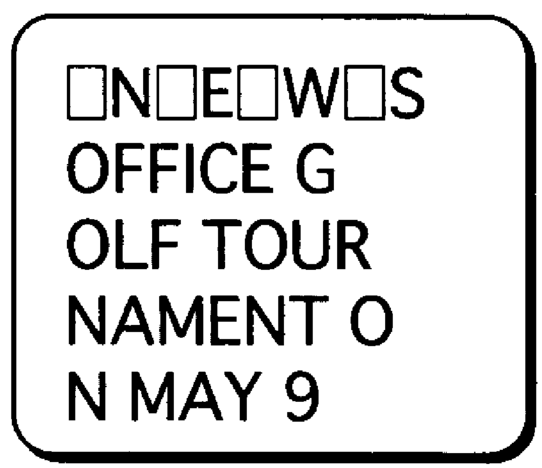

FIG. 4B shows how the character message is displayed on the screen when the display inhibition mode is on. Five space characters in total are inhibited from being displayed, and the heading is displayed in one line.

It should be noted that when a plurality of kinds of delimiter characters are specified as display inhibition targets, the procedure shown in FIG. 3 will be executed on each kind of delimiter characters.

As explained so far, with the communication terminal apparatus 1 of the present embodiment, when a character message that includes delimiter characters arranged in a sequence is to be displayed, part of the sequence of the delimiter characters will be inhibited from being displayed; therefore, it is possible to avoid inconvenient situations where it is difficult to read the text on the screen because of unnecessary line feeds or it is required to scroll the screen frequently.

In addition, in the embodiment above, the display inhibition process for space characters are executed in such a manner that the controlling unit 20 provides the main display unit 2' with the character message data to which display inhibition information is attached so that the main display unit 2' displays the character message according to the display inhibition information; however, it is also acceptable to execute display inhibition in other different ways. For example, it is acceptable that (i) when providing the main display unit with character message data, the controlling unit does not provide the data for the space characters being the display inhibition targets (in which case, the main display unit merely displays all the character data having been provided, without reservation) or (ii) the controlling unit deletes the data for the space characters being the display inhibition targets from the character message data stored in the RAM 20*b* before it is provided for the main display unit.

It should be noted that, although only delimiter characters included in e-mail messages are taken as display inhibition targets in the embodiment above, it is also possible to apply the similar display inhibition process to delimiter characters that are included in a character data sequence downloaded from a website.

INDUSTRIAL APPLICABILITY

The present invention is effective with a terminal apparatus that displays character data on a small-sized display screen, and particularly with a communication terminal apparatus that displays, on a display screen, character messages included in e-mail messages.

The invention claimed is:

1. A communication terminal apparatus that receives and displays, on a display unit, pieces of character data, comprising:

a temporary storage unit, operable to store therein the received pieces of character data;

a detecting unit operable to detect, among the received pieces of character data, an overlong delimiter string which is made up of pieces of data that are for delimiters of a predetermined kind and are arranged in a sequence longer than a predetermined upper limit;

an inhibition target specifying unit operable to generate display inhibition information that identifies positions of one or more of the pieces of data that are included in the overlong delimiter string and are specified as an inhibition target, which is to be inhibited from being displayed; and a display controlling unit operable to display, on the display unit, the received pieces of character data stored in the temporary storage unit, except for the inhibition target.

2. The communication terminal apparatus of claim 1, further comprising a designation receiving unit operable to receive a designation of whether it is necessary to perform the display inhibition on delimiters, and when the designation receiving unit receives a designation that it is necessary, the detecting unit performs the detection of the overlong delimiter string.

3. The communication terminal apparatus claim 2, wherein the delimiters are space characters.

4. The communication terminal apparatus of claim 1, further comprising an upper limit receiving unit operable to receive in advance a value specified as the predetermined upper limit.

5. The communication terminal apparatus claim 4, wherein the delimiters are space characters.

6. The communication terminal apparatus of claim 1, further comprising a specified-kind receiving unit operable to receive what kind of delimiter is specified as the predetermined kind.

7. The communication terminal apparatus claim 6, wherein the delimiters are space characters.

8. The communication terminal apparatus claim 1, wherein the delimiters are space characters.

9. A character displaying method to be used in a communication terminal apparatus that receives and displays, on a display unit, pieces of character data, the character displaying method comprising:

a storing step of storing the received pieces of character data into a temporary storage unit;

a detecting step of detecting, among the received pieces of character data, an overlong delimiter string which is made up of pieces of data that are for delimiters of a predetermined kind and are arranged in a sequence longer than a predetermined upper limit;

an inhibition target specifying step of generating display inhibition information that identifies positions of one or more pieces of data that are included in the overlong delimiter string and are specified as an inhibition target, which is to be inhibited from being displayed; and a display controlling step of displaying, on the display unit, the received pieces of character data stored in the temporary storage unit, except for the inhibition target.

10. A program for having a computer execute processing of a communication terminal apparatus serving as a character display apparatus that receives and displays, on a display unit, pieces of character data, the character display apparatus comprising:

a temporary storage unit operable to store therein the received pieces of character data;

a detecting unit operable to detect, among the received pieces of character data, an overlong delimiter string which is made up of pieces of data that are for delimiters of a predetermined kind and are arranged in a sequence longer than a predetermined upper limit;

an inhibition target specifying unit operable to generate display inhibition information that identifies positions of one or more of the pieces of data that are included in the overlong delimiter string and are specified as an inhibition target, which is to be inhibited from being displayed; and a display controlling unit operable to display, on the display unit, the received pieces of character data stored in the temporary storage unit, except for the inhibition target.

* * * * *